(12) United States Patent
Weissman et al.

(10) Patent No.: US 8,661,060 B2
(45) Date of Patent: Feb. 25, 2014

(54) EDITING A NETWORK OF INTERCONNECTED CONCEPTS

(75) Inventors: Adam J. Weissman, Federal Way, WA (US); Gilad Israel Elbaz, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/277,693

(22) Filed: Oct. 20, 2011

(65) Prior Publication Data

US 2012/0041959 A1  Feb. 16, 2012

Related U.S. Application Data (63) Continuation of application No. 10/748,399, filed on Dec. 30, 2003, now Pat. No. 8,051,104, which is a continuation-in-part of application No. 09/493,701, filed on Jan. 28, 2000, now Pat. No. 6,816,857, which is a continuation-in-part of application No. 09/431,760, filed on Nov. 1, 1999, now Pat. No. 6,453,315.

(60) Provisional application No. 60/155,667, filed on Sep. 22, 1999, provisional application No. 60/491,422, filed on Jul. 30, 2003.

(51) Int. Cl.
*G06F 7/00* (2006.01)
*G06F 17/00* (2006.01)

(52) U.S. Cl.
USPC ........... 707/796; 707/797; 707/953; 707/954; 707/956

(58) Field of Classification Search
USPC .......................... 707/796, 797, 953, 954, 956
See application file for complete search history.

(56) References Cited

U.S. PATENT DOCUMENTS

| 4,839,853 | A | 6/1989 | Deerwester et al. |
|---|---|---|---|
| 5,325,298 | A | 6/1994 | Gallant |
| 5,404,506 | A | 4/1995 | Fujisawa et al. |
| 5,499,360 | A | 3/1996 | Barbara et al. |
| 5,619,709 | A | 4/1997 | Caid et al. |
| 5,694,523 | A | 12/1997 | Wical |
| 5,708,822 | A | 1/1998 | Wical |
| 5,724,571 | A | 3/1998 | Woods |

(Continued)

FOREIGN PATENT DOCUMENTS

| EP | 1160686 A2 | 12/2001 |
|---|---|---|
| KR | 2001113258 A | 12/2001 |
| WO | WO 00/79436 A2 | 12/2000 |

OTHER PUBLICATIONS

International Search Report and the Written Opinion of the International Searching Authority, or the Declaration, Nov. 17, 2004, Google Inc.

(Continued)

*Primary Examiner* — Paul Kim
(74) *Attorney, Agent, or Firm* — Fish & Richardson P.C.

(57) ABSTRACT

Systems and methods that create and edit a network of interconnected concepts are disclosed. In one embodiment, a semantic engine implements a method comprising receiving a primary term representing a first concept to be added to a network of interrelated concepts, receiving at least one related term related to the primary term, receiving at least one relationship between the first concept and a second concept, receiving a strength value associated with the relationship, and adding the first concept to the network.

18 Claims, 6 Drawing Sheets

(56) References Cited

U.S. PATENT DOCUMENTS

| | | | |
|---|---|---|---|
| 5,768,580 | A | 6/1998 | Wical |
| 5,778,363 | A | 7/1998 | Light |
| 5,778,364 | A | 7/1998 | Nelson |
| 5,845,278 | A | 12/1998 | Kirsch et al. |
| 5,848,396 | A | 12/1998 | Gerace |
| 5,878,223 | A | 3/1999 | Becker et al. |
| 5,887,120 | A | 3/1999 | Wical |
| 5,918,236 | A | 6/1999 | Wical |
| 5,930,788 | A | 7/1999 | Wical |
| 5,933,822 | A | 8/1999 | Braden-Harder et al. |
| 5,940,821 | A | 8/1999 | Wical |
| 5,953,718 | A | 9/1999 | Wical |
| 5,960,383 | A | 9/1999 | Fleischer |
| 5,987,404 | A | 11/1999 | Della Pietra et al. |
| 6,038,560 | A | 3/2000 | Wical |
| 6,044,375 | A | 3/2000 | Shmueli et al. |
| 6,061,675 | A | 5/2000 | Wical |
| 6,067,552 | A | 5/2000 | Yu |
| 6,101,515 | A * | 8/2000 | Wical et al. ............ 715/234 |
| 6,112,201 | A | 8/2000 | Wical |
| 6,119,164 | A | 9/2000 | Basche |
| 6,134,532 | A | 10/2000 | Lazarus et al. |
| 6,199,034 | B1 | 3/2001 | Wical |
| 6,240,410 | B1 | 5/2001 | Wical |
| 6,269,361 | B1 | 7/2001 | Davis et al. |
| 6,289,342 | B1 | 9/2001 | Lawrence et al. |
| 6,289,353 | B1 | 9/2001 | Hazlehurst et al. |
| 6,298,348 | B1 | 10/2001 | Eldering |
| 6,314,419 | B1 | 11/2001 | Faisal |
| 6,324,519 | B1 | 11/2001 | Eldering |
| 6,324,538 | B1 | 11/2001 | Wesinger et al. |
| 6,421,675 | B1 | 7/2002 | Ryan et al. |
| 6,453,315 | B1 | 9/2002 | Weissman et al. |
| 6,460,034 | B1 | 10/2002 | Wical |
| 6,473,730 | B1 | 10/2002 | McKeown et al. |
| 6,484,161 | B1 | 11/2002 | Chipalkatti et al. |
| 6,487,545 | B1 | 11/2002 | Wical |
| 6,594,658 | B2 | 7/2003 | Woods |
| 6,651,058 | B1 | 11/2003 | Sundaresan et al. |
| 6,763,349 | B1 | 7/2004 | Sacco |
| 7,024,624 | B2 | 4/2006 | Hintz |
| 2001/0049674 | A1 | 12/2001 | Talib et al. |
| 2002/0099700 | A1 | 7/2002 | Li |
| 2002/0165849 | A1 | 11/2002 | Singh et al. |
| 2002/0174101 | A1 | 11/2002 | Fernley et al. |
| 2003/0126235 | A1 | 7/2003 | Chandrasekar et al. |
| 2005/0223002 | A1 | 10/2005 | Agarwal et al. |
| 2006/0069613 | A1 | 3/2006 | Marquardt |
| 2006/0259357 | A1 | 11/2006 | Chiu |

OTHER PUBLICATIONS

International Preliminary Report on Patentability, Jan. 30, 2006, Google Inc.

U.S. Appl. No. 09/493,701, filed Jan. 28, 2000 to Weissman, et al.

Kerschberg, et al. "A Semantic Taxonomy-Based Personalizable Meta-Search Agent", Conference Proceedings Article, vol. 1. Dec. 3, 2001.

Voss, et al., "Concepts as Knowledge Handles in Collaborative Document Management", Enabling Technologies: Infrastructure for Collaborative Enterprises, 1999.

Apted, et al., "Visualisation of Ontological Inferences for User Control of Personal Web Agents", Proceedings of the Seventh International Conference on Information Visualization (IV '03).

Lin, Shian-Hua et al., "Discovering Informative Content Blocks from Web Documents", Proceedings of the ACM SIGKDD International Conference on Knowledge Discovery and Data Mining, Jul. 23, 2002-Jul. 26, 2002, pp. 588-593, Edmonton, Alberta Canada.

"Applied Semantics Launches Contextual Targeting Pay-For-Performance Ad Serving Solution", Applied Semantics Press Release, Oct. 21, 2002, pp. 1-2, http://www.appliedsemantics.comlne/ne_pr_102102.html.

"Applied Semantics Launches News Series to Power Publishing", Applied Semantics, Inc.—Press Release. Aug. 13, 2002, pp. 1-2, http://www.appliedsemantics.comlne/ne_pr_081302.html.

"Applied Semantics News Series," pp. 1-4, brochure, no date.

Chi et al. "Context Query in Information Retrieval", Proceedings of the 14th IEEE International Conference on Tools with Artificial Intelligence, IEEE Comp. Soc, vol. Conf. 14, Nov. 2002, pp. 101-106.

"CIRCA Technology Overview," Applied Semantics White Paper, Jul. 2001, pp. 1-10.

"CONVERA—Products: RetrievalWare," printed Oct. 30, 2003, http://www.convera.com/products/rw_precisions.asp.

Fellbaum, C., ed., "WordNet: An Electronic Lexical Database", Cambridge: The MIT Press, Mar. 1998, pp. 117-127,285-303. P325. 5.D38W67 1998.

Geller, M., "Quigo Signs Deal with Overture", MediaDailyNews, Aug. 13, 2003, pp. 1-3, http://www.mediapost.comIdtls_dsp_news.cfm?newsID=215196.

Koll, M.B., "Information Retrieval Theory and Design Based on a Model of the User's Concept Relations", Proceedings of the 3rd Annual ACM Conference on Research and Development in Information Retrieval, 1980, pp. 77-93.

"Ontology Usage and Applications", Applied Semantics Technical White Paper, Jul. 2001, pp. 1-15.

"Powerful Revenue Solutions for Online Publishers", Applied Semantics AdSense, pp. 1-2. brochure, no date.

Tengi, R.I., "Design and Implementation of the WordNet Lexical Database and Searching Software", in WordNet: An Electronic Lexical Database, Fellbaum C. ed., Cambridge: The MIT Press, Mar. 1998. pp. 105-127.

"Verity Introduces Customizable Industry and Enterprise Taxonomies", Verity, Nov. 17, 2003, pp. 1-2.

Voorhees. E.M., "Query Expansion Using Lexical-Semantic Relations", Proceedings of the 17'h Annual ACM Conference on Research and Development in Information Retrieval, Aug. 1994, pp. 61-69.

* cited by examiner

EDITING A NETWORK OF INTERCONNECTED CONCEPTS

CROSS-REFERENCE TO RELATED APPLICATIONS

This application is a continuation of U.S. patent application Ser. No. 10/748,399, filed Dec. 30, 2003, entitled "Editing a Network of Interconnected Concepts", which is a continuation-in-part of U.S. patent application Ser. No. 09/493,701 filed Jan. 28, 2000, entitled "Meaning-Based Advertising and Relevance Determination," now U.S. Pat. No. 6,816,857, which is a continuation-in-part of U.S. patent application Ser. No. 09/431,760, filed Nov. 1, 1999, entitled "Meaning-Based Information Organization and Retrieval," now U.S. Pat. No. 6,453,315, which claims priority to U.S. Provisional Patent Application Ser. No. 60/155,667 filed Sep. 22, 1999, all of which are hereby incorporated in their entirety by this reference, and U.S. patent application Ser. No. 10/748,399 claims priority to U.S. Provisional Patent Application Ser. No. 60/491,422 filed Jul. 30, 2003 entitled "Systems and Methods of Organizing and Retrieving Information Based on Meaning," which is hereby incorporated in its entirety by this reference.

FIELD OF THE INVENTION

The invention generally relates to a network of interconnected concepts. More particularly, the invention relates to methods and systems for editing a network of interconnected concepts.

BACKGROUND OF THE INVENTION

Improving mechanisms for searching vast numbers of documents, such as those available via the World Wide Web ("web") or on large enterprise computer networks, has increasingly been an area of focus and research. This is especially due to the continued growth in the number of computer users, services and applications offered for example on the web, and the amount of information being added to the web, enterprise computer networks and other databases.

A search engine or search engine program is a widely used mechanism for allowing users to search vast numbers of documents for information. Conventional search engines index the documents and the terms appearing in the documents. A term can be a string of characters or groups of strings of characters representing a one or more related words. Generally, a search engine provides a user interface that includes a query field. A user can enter one or more search terms describing the desired information in the query field. In response to a query, the search engine attempts to locate relevant documents by matching the search terms to the indexed terms appearing in the documents. Based on these matches, the search engine ranks, sorts and then returns for display the search results, usually as a list of relevant documents.

Typically, the concept or concepts represented by the search terms or the terms in the documents are not taken into account. A concept can be a normalized semantic representation that can be expressed with any number of terms. Methods of complex searching exist, but most of these methods of complex searching are term based. For example, an advanced Boolean search or an advanced text search are both based on terms and not concepts. With a term search, documents are converted into a list of terms with relative rankings and the document's terms are compared with the search terms. Term searches can provide poor results when faced with terms having multiple meanings, the use of synonyms, and important terms that are not used frequently. Further, it is difficult to search for a concept using term-based searching methods. For example, if it is desired to search all documents that mention the concept "California cities", each city must be enumerated as a search term.

In order to provide a concept-based search, a search engine can utilize a network of concepts. While such networks of concepts exist, these conventional networks generally associate concepts in a hierarchical fashion and provide no weight to the associations. Further, such conventional networks of concepts are not easily editable.

SUMMARY

Embodiments of the present invention comprise methods and systems for editing a network of interconnected concepts. In one embodiment, a semantic engine implements a method comprising receiving a primary term representing a first concept to be added to a network of interrelated concepts, receiving at least one related term related to the primary term, receiving at least one relationship between the first concept and a second concept, receiving a strength value associated with the relationship, and adding the first concept to the network. In another embodiment, a semantic engine implements a method comprising receiving a request to edit a first concept in a network of interrelated concepts, causing the display of the first concept, receiving a request to add at least one relationship between the first concept and a second concept, receiving a strength value associated with the relationship, and updating the first concept in the network. Additional aspects of the present invention are directed to computer systems and to computer-readable media having features relating to the foregoing aspects.

Further details and advantages of embodiments of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for editing a network of interconnected concepts. In one embodiment, a semantic engine allows for the creation and editing of concepts in a network of interconnected concepts or ontology. The concepts can be defined by a synset or a group of related terms, such as synonyms and acronyms, relationships, both hierarchical and lateral, with other concepts, and the strength of the relationships with other concepts. The semantic engine allows for the creation or editing of a concept by allowing a user to define the related terms, the relationships with other concepts, and the strength of the relationships.

Reference will now be made in detail to exemplary embodiments of the invention as illustrated in the text and accompanying drawings. The same reference numbers are used throughout the drawings and the following description to refer to the same or like parts.

Figure 1:
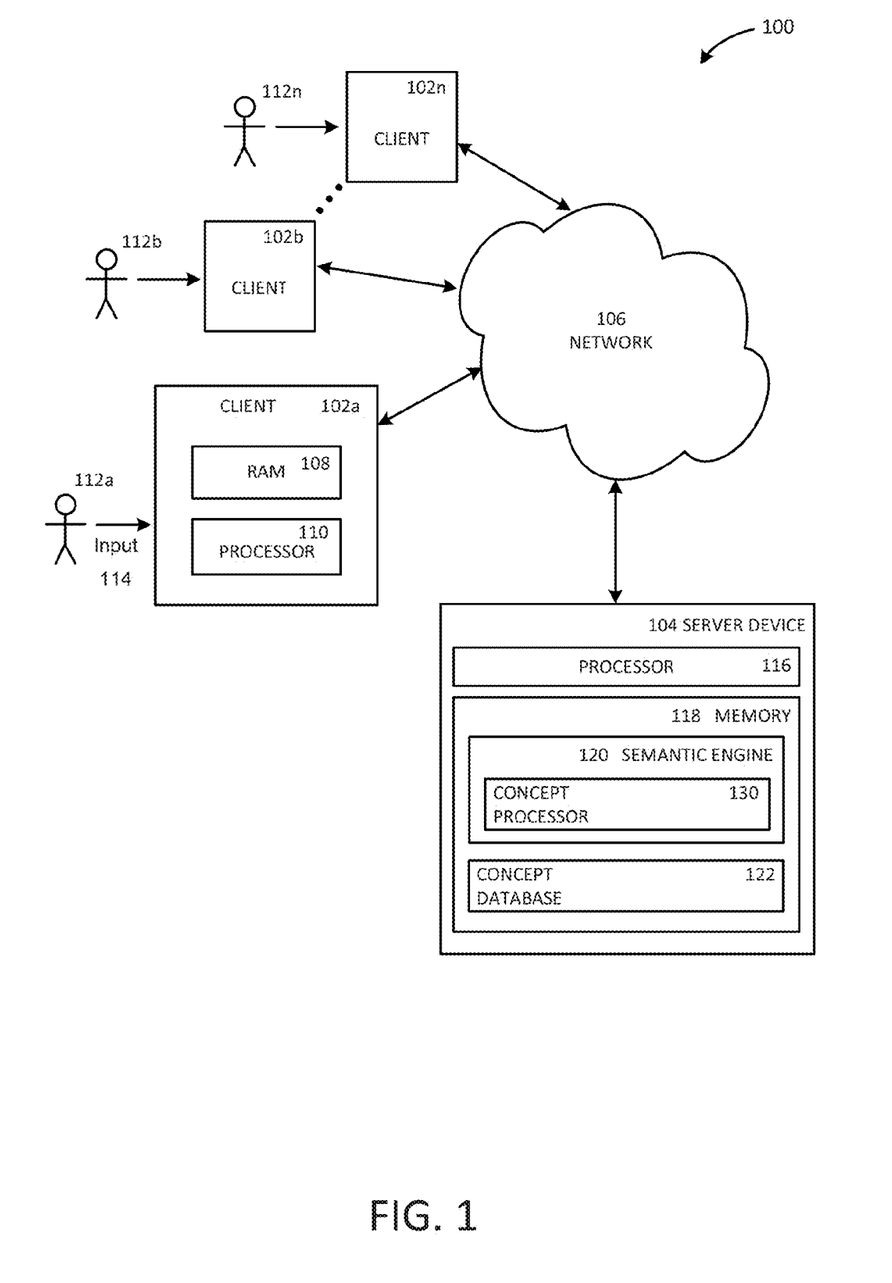
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, a server device 104 and a network 106. The network 106 shown can be the Internet. In other embodiments, other networks, such as an intranet may be used. Moreover, methods according to the present invention may operate in a single computer. The client devices 102a-n shown each include a computer-readable medium, such as a random access memory (RAM) 108 in the embodiment shown, coupled to a processor 110. The processor 110 executes a set of computer-executable program instructions stored in memory 108. Such processors may include a microprocessor, an ASIC, and state machines. Such processors include, or may be in communication with, storage devices, for example computer-readable storage devices, which store instructions that, when executed by the processor, cause the processor to perform the steps described herein. Embodiments of computer-readable storage devices include, but are not limited to, an electronic, optical, magnetic, or other storage device capable of providing a processor, such as the processor in communication with a touch-sensitive input device, with computer-readable instructions. Other examples of suitable storage devices include, but are not limited to, a floppy disk, CD-ROM, magnetic disk, memory chip, ROM, RAM, an ASIC, a configured processor, all optical media, all magnetic tape or other magnetic media, or other medium from which a computer processor can read instructions. The instructions may comprise code from any computer-programming language, including, for example, C, C++, C#, VISUAL BASIC, JAVA, PYTHON, PERL, and JAVASCRIPT.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a user interface application program and/or a browser application program such as Internet Explorer™, version 6.0 from Microsoft Corporation, Netscape Navigator™, version 7.1 from Netscape Communications Corporation, and Safari™, version 1.0 from Apple Computer. Through the client devices 102a-n, users 112a-n can communicate over the network 106 with each other and with other systems and devices coupled to the network 106.

As shown in FIG. 1, server device 104 is also coupled to the network 106. The server device 104 shown includes a server executing a semantic engine program. The system 100 can also include multiple other server devices. Similar to the client devices 102a-n, the server device 104 shown includes a processor 116 coupled to a computer readable memory 118. The server device 104 is depicted as a single computer system, but may be implemented as a network of computer processors. Examples of server device 104 are servers, mainframe computers, networked computers, a processor-based device and similar types of systems and devices. Client processors 110 and server processor 116 can be any of a number of well known computer processors, such as processors from Intel Corporation of Santa Clara, Calif. and Motorola Corporation of Schaumburg, Ill.

Memory 118 of the server device 104 contains a semantic engine application program, also known as a semantic engine 120. The semantic engine 120 manages and provides access to a network of interconnected concepts or ontology. In one embodiment, the semantic engine 120 also can index articles and concepts found in articles to enable the location and retrieval of information. Articles include, documents, for example, web pages of various formats, such as HTML, XML, XHTML, Portable Document Format (PDF) files, and word processor, database, and application program document files, audio, video, or any other information of any type whatsoever made available on a network (such as the Internet or intranet), a personal computer, or other computing or storage means. The embodiments described herein are described generally in relation to documents, but embodiments may operate on any type of article.

The semantic engine 120 shown includes a concept processor 130, which, in the embodiment shown, comprises computer code residing in the memory 118. The concept processor 130 can edit and create concepts in a network of interconnected concepts based on information received from a client device 102a input 114 by a user 112a. The client processor 130 can have a user interface application that allows user 112a via the client device 102a to interact with the concept processor 130 to edit existing concepts and create new concepts in the ontology.

Server device 104 also provides access to other storage elements, such as a concept storage element, in the example shown a concept database 122. The concept database 120 can be used to store the ontology. The concept database can be located in memory 118 as shown or can be located external to server device 104. Data storage elements may include any one or combination of methods for storing data, including without limitation, arrays, hash tables, lists, and pairs. Other similar types of data storage devices can be accessed by the server device 104.

It should be noted that the present invention may comprise systems having different architecture than that which is shown in FIG. 1. For example, in some systems according to the present invention, the semantic engine 120 may not be on a single server device 104, but may be on multiple server devices. The system 100 shown in FIG. 1 is merely exemplary, and is used to explain the exemplary methods shown in FIGS. 5 and 6.

As explained above, the concept database 122 can contain an ontology that can describe a semantic space that can be employed to facilitate concept-based location and retrieval of information. The ontology consists of a plurality of concepts, which are connected to one another through many different types of relationships, such as, for example, "kind of", "has kind", "part of""has part", "member of", "has member", "substance of", "has substance", "product of", and "has product". For example, the concept of "table" is connected to the concept of "furniture" through a "kind of"connection. Thus, "table" is a "kind of" "furniture". Similarly, "California" is a part of the "United States", the "United States" has part "California", the "United States" is a member of the "NATO", and "NATO" has member "United States".

The ontology according to one embodiment of the present invention also includes bind or lateral bond relationships between concepts. A lateral bond relationship describes one concept's closeness to another in an average person's common understanding. For example, "skier" and "skiing" are not closely related concepts in conventional ontologies. The former is a kind of "athlete", ultimately a kind of "human being"; and thus would reside within the "entity" or "living thing" tree. The latter is a kind of "sport", ultimately a kind of "activity"; it is in the "actions" tree. Though the subjects are closely related in everyday usage, they may be in widely separated locations within a conventional ontology. To remedy this, a bind or lateral bond can be made between the two concepts, to reflect their close proximity in semantic space (when an average person thinks of one concept, the person tends to think of the other).

Figure 2:
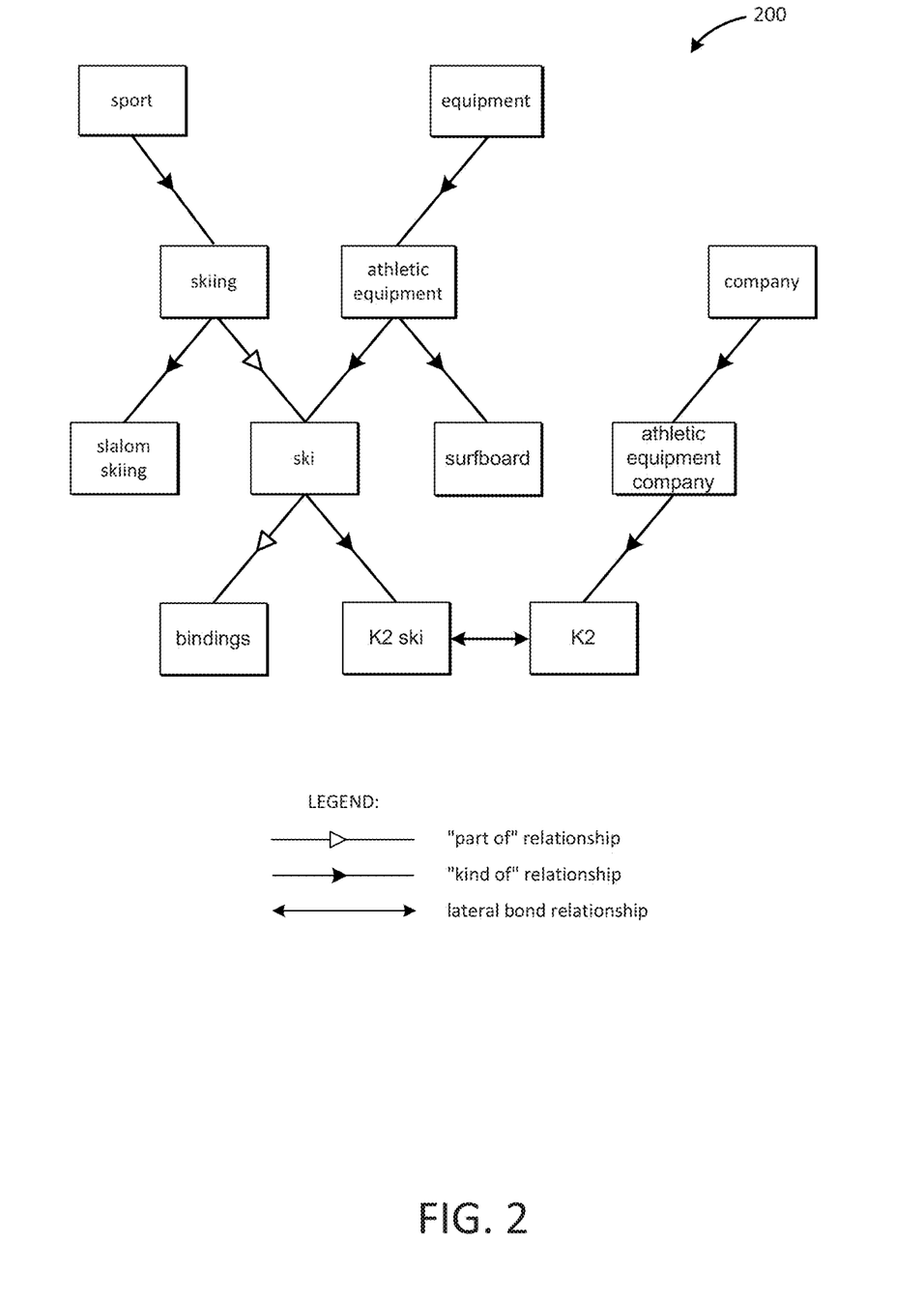
FIG. 2 illustrates an example of a portion of a relationship-based ontology in accordance with one embodiment of the present invention.

The relationships between elements may take on many forms and can become quite complex, but for ease of illustration, a simple example is illustrated by FIG. 2. The boxed elements in FIG. 2 represent meanings within the ontology and collectively, along with the relationship connections between meanings can be viewed as defining a semantic space. The relationship types "part of", "kind of" and "lateral bond" are represented by differing line types in FIG. 2, a legend for which is drawn thereon.

The example in FIG. 2 concerns skiing. Starting with the branch for "sport", "skiing" is defined in the ontology 200 as a kind of "sport". The word "ski" typically, in its noun form, can be thought of as related to "skiing" in that it is a "part of" "skiing" as shown in FIG. 2. "Slalom skiing" is a type of skiing and hence a "kind of" connection is shown between it and "skiing". "Bindings" are a structural attachment on a ski, and hence it is assigned a "part of" connection with "ski". The example of a specific brand of ski, "K2 ski," is given to show how it is in a "kind of" connection with "ski".

"K2 ski" is also assigned a lateral bond showing a conceptual commonness with the manufacturer of the ski "K2" which lies in the "company" branch. The lateral bond can be, for example, "product of". The company branch has a child "athletic equipment company" as a "kind of" "company." "Athletic equipment company" has as its child in turn the "K2" company.

Considering "ski" once again, "ski" is also a child of the "equipment" branch which has "athletic equipment" as a "kind of" "equipment" and ski as a "kind of" "athletic equipment". "Surfboard" is related to "ski" in that it too is a "kind of" "athletic equipment". Target documents or nodes within a subject directory may be "placed" or "located" by human intervention or automatically into the semantic space as defined by ontology 200. A document containing information concerning the sale of skis or skiing destinations would fall somewhere within the defined semantic space based upon its focus of content.

The ontology according to one embodiment of the present invention also includes bond strength between concepts. A value can be assigned to a connection from one concept to another that signifies how strongly the second meaning relates to the first. These connections can be dependant on the direction of the bond, so that, for example, "skier" might imply a strong connection to "skiing", whereas "skiing need not imply "skier" to the same degree.

Figure 3:
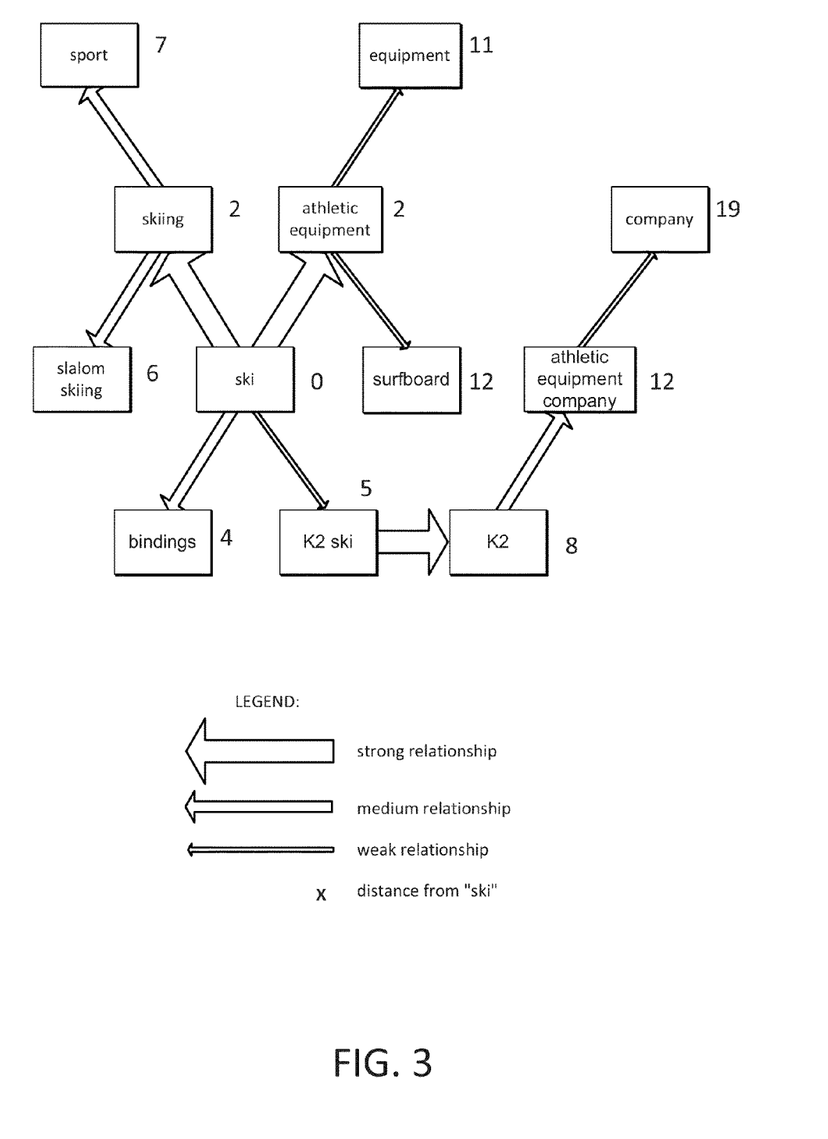
FIG. 3 illustrates an example of bond strength and semantic distance in a portion of a relationship-based ontology in accordance with one embodiment of the present invention.

FIG. 3 illustrates an example of bond strengths and semantic distances between the concepts illustrated in FIG. 2. FIG. 3 illustrates how distance and closeness of meaning between concepts can be quantified within the semantic space. Distances are shown between the element "ski" and all other elements within the semantic space. Using three classes of bond strengths the degree of closeness between concepts may be discovered. A "strong relationship" exists between "ski" and "skiing" as does between "ski" and "athletic equipment." Between "skiing" and "sport" there is a weaker than strong relationship known as a "medium relationship". This is because when the average person thinks of the root term "skiing" they do not typically think also of "sport". Going from "ski" to "skiing" however, the average person would more likely associate or think "skiing" if given the term "ski". The direction of the arrows in the bond strengths indicates the direction of association. For example, "A→B" in FIG. 3 means that given the concept A, how likely is it or closely would an average person associate the concept B. Going the other direction between the same two concepts may produce a different bond strength.

A "weak relationship" is displayed between "ski" and "K2 ski" (when an average person thinks of "ski," "K2 ski" does not closely come to mind). However, if an average person were to go from "K2 ski" to "ski" this might be construed as a strong relationship since they would naturally associate "ski" if given "K2 ski".

FIG. 3 also shows semantic distances between concepts. "Ski" and "skiing" have only a distance of two between them while "skiing" and "sport" have a distance of five (seven minus two). The distance between "ski" and "sport" is seven. When traveling from parent to child or vice-versa, the distances can be simply added/subtracted but when changing the direction of travel, a penalty may be imposed upon the distance calculation. Take, for example, the distance between "ski" and "athletic equipment company". Judging merely on a linear basis, the distance might be twelve. But since the path from "ski" to "athletic equipment company" switches direction twice (it starts down to "K2 ski" and then across the lateral bond to "K2" and then up to "athletic equipment company") a penalty or scaling factor can cause the distance between "ski" and "athletic equipment" to be much larger than just twelve especially given their lack of connectedness. As described above, penalties may be added when the direction of traversal is switched or when a lateral bond is crossed. Distances between concepts may be calculated and stored for future use. Semantic distances can be determined in a variety of ways, such as, for example, as described in U.S. Pat. No. 6,453,315, which is hereby incorporated by reference.

The closeness of meanings is affected to a large degree by their perceived "precision". For example, we can guess at how close the concepts of "sports" and "baseball" are based on the fact that there are many other particular kinds of sports under "sports" than baseball. As baseball appears to be one of many, it's connection to the concept of "sports" is not as strong as if, say, there were only two sports in the world, and baseball was thus one of only two possibilities for what is meant by "sports". This idea is reflected in an algorithm that estimates the "kind of" and "part of" precision of a meaning based on the total count of its descendants, following "kind of " and "part of" relationships. In these calculations, meanings marked as "instances" are biased against, as they would tend to incorrectly dilute the precision of a concept otherwise.

Differences in estimates of precision are used to generate a semantic distance between two directly connected meanings only when a connection strength has not been set. Manual settings override the calculated estimates; thus the semantic distance results come about from a combination of automatically estimated connection strengths, and strengths that have been manually set.

The process for discovering meanings that are semantically close to a specific meaning involves a traditional breadth-first search outward from the origin meaning Neighboring meanings in the network of nodes are explored in an outward seeking fashion, and distance from the origin is tracked. When a certain radius has been reached, the search stops. Intricacies in this search include the following:

1. A "scaling factor", somewhat like a "velocity" is tracked as the search spreads outward. This scaling factor multiplies the perceived distance for a single jump. One net effect of this factor is to reduce the perceived distance to meanings that are close, thus the drop-off of distance is not linear as the search expands. This is a result of an increase in scaling factor based linearly on the previous jump distance.

2. The scaling factor is also modified by a change in direction of the search within the lexicon hierarchy. For example, a jump down to a child from a parent that was previously jumped up to from another child, incurs a scale factor increase penalty. Similar penalties arise from jumps down then up, from jumps in "kind of" that occur after "part of"(and vice versa), and from combinations of these.

3. Lateral "bond" type connections also incur scale factor penalties, based on the set distance of the jump.

4. "Psuedosynset" and "instance" meanings are treated in a special way. When used as the origin, they imply that the search for related meanings should be within a smaller radius, as their own greater degree of exactness imply a more specific kind of search for meanings is called for. Thus the search does not expand as far; this is controlled by starting the search with a higher scaling factor. Additionally, a different measurement of precision is used, which includes detailed terms that are otherwise excluded from the standard precision algorithm initially. (Alternately, if the origin meaning is not a pseudosynset or instance meaning, then the standard precision values excluding count of descendant pseudosynsets are used.)

The concept processor 130 can update and expand the ontology to include new concepts or update relationships and other information for concepts already present. Concepts can be updated or added to reflect the changes in everyday culture or for a particular enterprise. For example, if a new ski manufacturer comes into existence called "Big Ski" this concept can be added to the ontology by a user. The user can define the relationships of other concepts to "Big Ski" and the strength of these relationships as well as other data that defines the concept.

Figure 4:
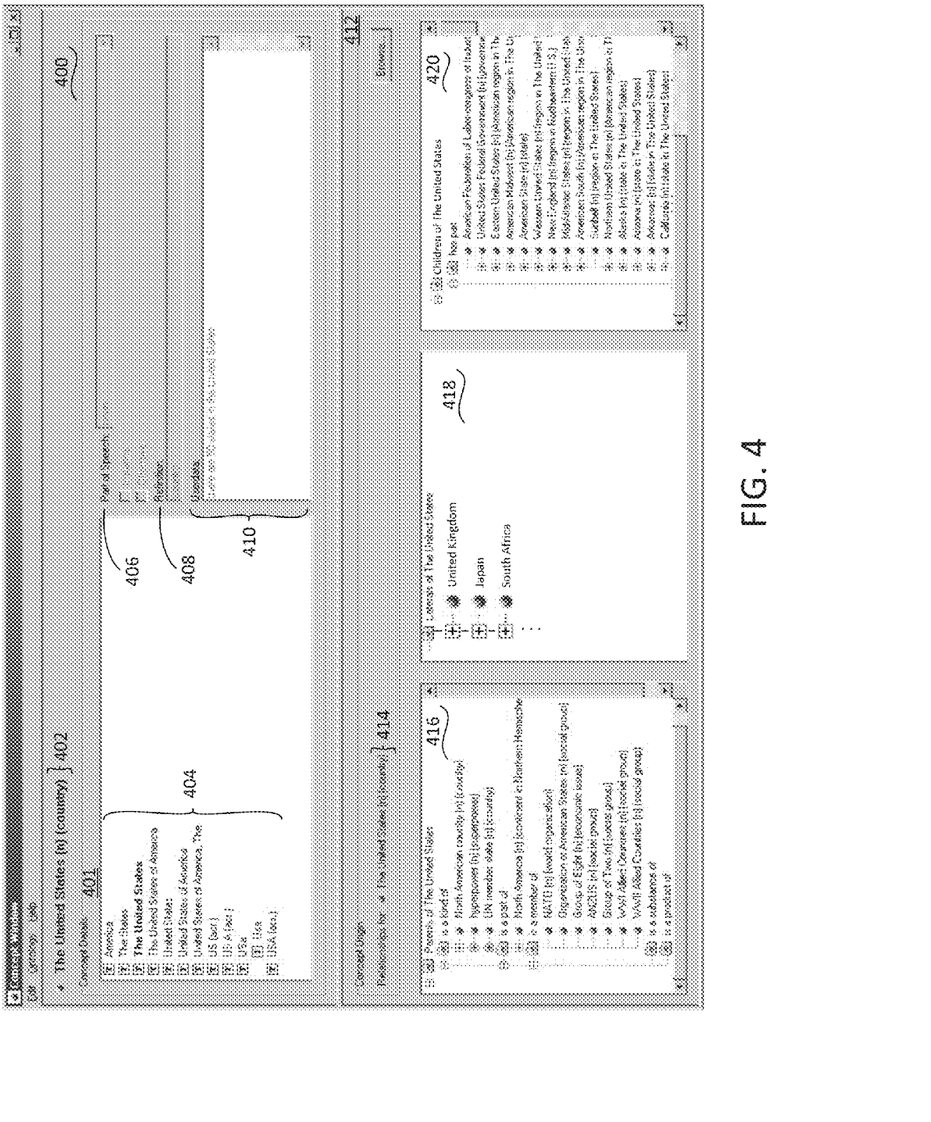
FIG. 4 illustrates an exemplary concept view in accordance with one embodiment of the present invention.

Concepts can be presented to a user 112a on a client device 102a in a concept view, such as a concept window. FIG. 4 illustrates an example of a concept window 400. The concept window 400 shows an example of a concept definition for "The United States". The primary term is shown at 402 and is "The United States". The primary term 402 also indicates the part of speech and provides a context for the concept (or refinition).

The concept window 400 shown further provides a concept details section 401 and a concept relationships section 412. The concept details section 401 can display various details of the concept. For example, at 404 the group of related terms associated with the concept is shown. The part of speech is shown at 406 and indicates that the concept shown is a noun. Refinition is showed at 408 and user data is shown at 410. The refinition box can be used to provide a context for the concept and the user data box can be used to further describe the concept.

The relationships for the concept are shown in the relationship section 412. The concept origin is shown at 414. The various relationships for the concept are shown in boxes 416, 418, and 420. In box 416, the parents of the concept are displayed and in box 420, children of the concept are displayed. Parent concepts and children concepts are concepts with a hierarchical relationship with the origin concept. In box 418, concepts having a lateral relationship with the origin concept are displayed Various methods in accordance with the present invention may be carried out. For example, in one embodiment a user request to create a first concept in a network of interrelated concepts is received, a concept view, such as a concept creation window, is displayed, a primary term representing the first concept is received, at least one related term associated with the primary term is received, at least one relationship between the first concept and a second concept is received, a strength value associated with the relationship is received, and the first concept is added to the network. In one embodiment, the relationship can be hierarchical or lateral and can be selected from one of the following: kind of, has kind, part of, has part, member of, has member, substance of, has substance, product of, and has product.

In another embodiment, a request to edit a first concept in a network of interrelated concepts is received, the first concept is displayed, at least one relationship between the first concept and a second concept is received, a strength value associated with the relationship is received, an edited strength value for an existing relationship between the first concept and another concept is received, and the first concept is updated in the network.

In one embodiment, information defining a part of speech of the first concept, information defining a frequency of the primary term, information defining a likelihood that the primary term and the related terms imply the first concept, information defining a breadth of the first concept, information that the first concept is offensive, user data, and context information, such as refinition, can also be received in order to create or edit the first concept.

Figure 5:
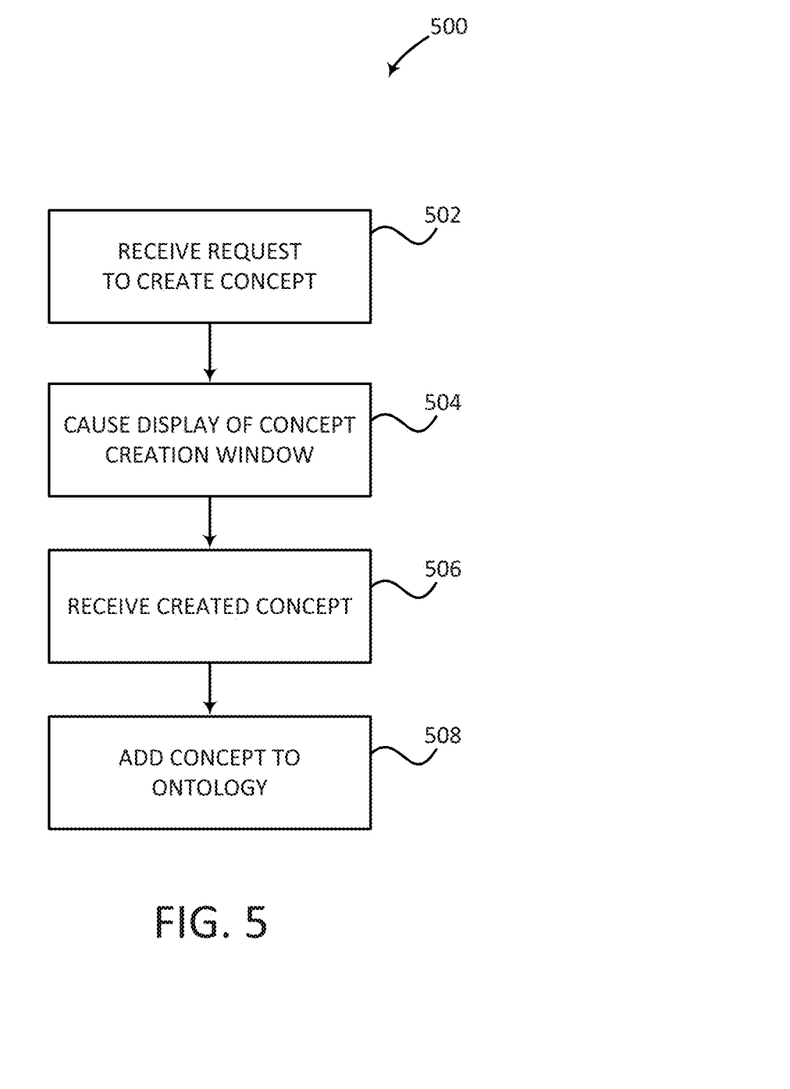
FIG. 5 illustrates a flow diagram of a method in accordance with one embodiment of the present invention.

FIG. 5 illustrates an exemplary method 500 that provides a method for creating concepts in a network of interconnected concepts or ontology. This exemplary method is provided by way of example, as there are a variety of ways to carry out methods according to the present invention. The method 500 shown in FIG. 5 can be executed or otherwise performed by any of various systems. The method 500 is described below as carried out by the system 100 shown in FIG. 1 by way of example, and various elements of the system 100 are referenced in explaining the example method of FIG. 5.

In 502, a request signal from a user to create a concept term is received by the semantic engine 120. The request signal can be created by a user interface application on client device 102a through input from the user 112a and passed to the server device 104 via the network 106.

In response to the signal, the concept processor 130 can cause, in 504, a concept view, such as a concept creation window, to be displayed on the client device 102a. The user 112a can be prompted for the entry of a variety of information in order to define the concept by the concept creation window. The information that defines the concept can include: a primary term used to identify the concept; a group of terms related to the primary term, such as synonyms and acronyms; related concepts and the relationship of the created concept to the related concepts; and the strength of these relationships. The information that defines the concept can also include: the part of speech of the concept; the frequency of the primary term; the likelihood that the primary term and the related terms imply the concept; the breadth or focus of the concept; the offensive nature of the concept; and the literal nature of the primary term. A concept definition can also include user data and a refinition.

In defining a new concept, a user can input a primary term associated with the concept in the concept creation window. The primary term can be the term most frequently associated with the concept. Next, a user can input a group of terms related to the primary term that are also associated with the concept in the concept creation window. For example, the related terms can be synonyms or acronyms of the primary term.

A user 112a can also input concepts related to the created concept and provide relationship types for each related concept. The relationships can include: "kind of"; "has kind"; "part of"; "has part"; "member of"; "has member"; "substance of"; "has substance"; "product of"; and "has product". Relationship types can also be specialized or customized, such as "causes symptom" and "symptom caused by" for a pharmaceutical or medical concept. The relationship type can also be "single concept" for concepts unrelated to others. In one embodiment, the user 112a can define the related concept by typing it in a related concept box and then defining the relationship type by choosing a relationship type from a drop down list.

For every relationship type, the user 112a can assign a strength to the relationship. The strength can be representative of how strong the relationship is. In one embodiment, the strength represents the distance in semantic space the created concept is from the related concept.

The user 112a can also input other information to define the concept. For example, the part of speech of the concept can be provided. A frequency of the primary term can be provided to represent the frequency of the primary term in normal usage or in the source documents. A probability can be provided of the likelihood that the primary term and the related terms imply the concept. The user can specify the breadth or focus of the concept and indicate whether the concept is offensive. The user 112a can also specify whether to match terms associated with the concept literally or can define non-literal acronym and abbreviation rules. The user can also provide user data and context for the concept (or refinition).

After the user 112a has defined the concept, the user 112a can request through the client device 102a that the concept be added to the ontology. This request can cause the data input by the user 112a in the concept creation window to be sent from the client device 102a via the network 106 to the semantic engine 120. In 508, the concept processor 130 can create a new concept in the ontology from the data received 506 from the client device 102a and can add the concept to the ontology in the concept database 122.

Figure 6:
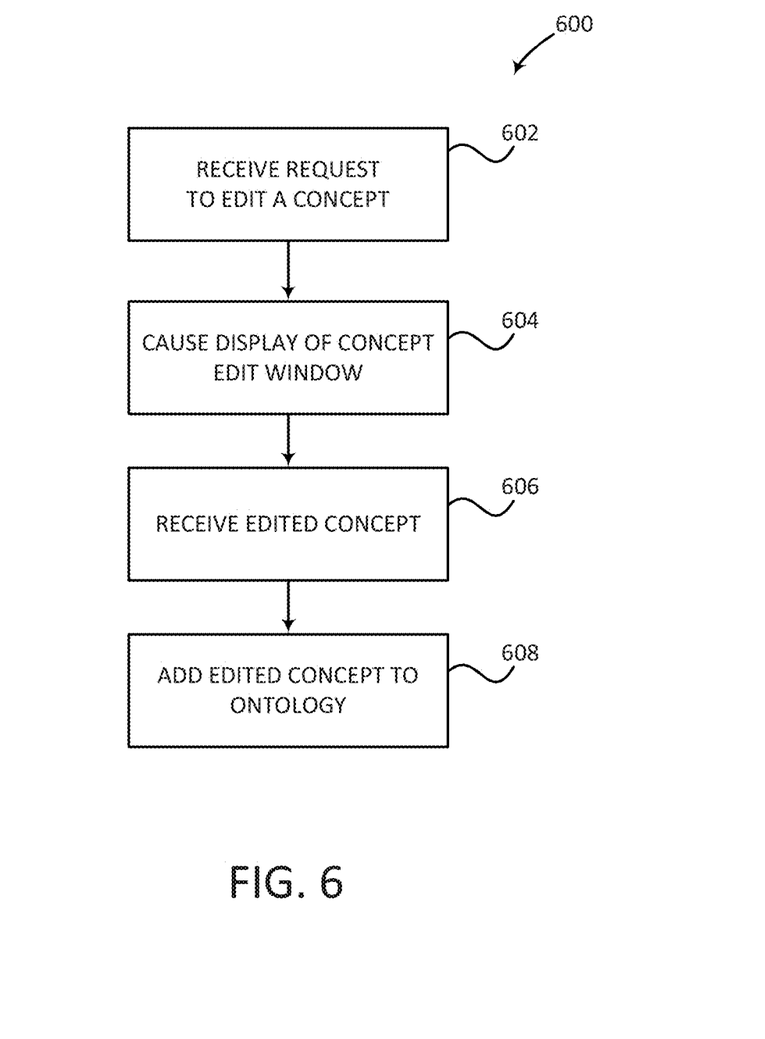
FIG. 6 illustrates a flow diagram of a method in accordance with one embodiment of the present invention.

FIG. 6 illustrates an exemplary method 600 that provides a method for editing concepts in an ontology. This exemplary method is provided by way of example, as there are a variety of ways to carry out methods according to the present invention. The method 600 shown in FIG. 6 can be executed or otherwise performed by any of various systems. The method 600 is described below as carried out by the system 100 shown in FIG. 1 by way of example, and various elements of the system 100 are referenced in explaining the example method of FIG. 6.

In 602, a request signal to edit a concept from a user 112a is received by the semantic engine 120. The request signal can be created by a user interface application on client device 102a through input from the user 112a. This request signal can include the concept to be edited and is passed to server device 104 via the network 106.

In response to the signal, the concept processor 130 can verify that the concept requested exists and can cause in 604 a concept editor window to be displayed on client device 102a. The concept editor window displays the concept definition that the user has requested to edit. A user can edit the various information used to define a concept as described above.

A user can edit the group of terms related to the primary term that are associated with the concept. For example, the user can add additional terms or delete related terms, such as synonyms or acronyms, of the primary term.

A user can also input additional concepts related to the edited concept, input relationship types for each related concept, and edit existing concepts and relationship types. In one embodiment, a user can define and/or edit the relationship type by choosing a relationship type from a drop down list. For the relationship types in the concept definition, the user can assign and edit a strength of the relationship. The user 112a can also input and edit other information in order to edit the concept as described above.

After the user 112a has edited the concept, the user 112a can request through the client device 102a that the edited concept be added to the ontology. This request can cause the data input by the user in the concept edit window to be sent from the client device 102a via the network 106 to the semantic engine 120. In 606, the edited concept is received by the semantic engine 120. In 608, the concept processor 130 can replace the concept in the ontology with the edited concept received from the user 112a or can add the edited data received from the user 112a to the concept in the ontology.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method comprising:

accessing, by one or more computers, a hierarchical network of connected concepts that defines a semantic space, the concepts being connected to one another through connections that have different strength values and different types of relationships, the relationships including (i) a parent-child type of relationship that connects concepts in a first direction in the hierarchical network, (ii) a child-parent type of relationship that connects concepts in a second, different direction in the hierarchical network, and (iii) a lateral bond type of relationship that connects concepts in a third, different direction in the hierarchical network;

identifying multiple connections that define a path between a first concept and a second concept in the hierarchical network;

aggregating the strength values of the multiple connections that define the path;

determining that one or more changes in direction occur along the path;

scaling, by one or more computers, the aggregated strength value using a penalty factor based on determining that one or more changes in direction that occur along the path; and assigning the scaled strength value as a value that quantifies a proximity of the first concept to the second concept in the semantic space.

2. The method of claim 1, wherein determining that one or more changes in direction occur along the path comprises determining a quantity of times that the path changes from the first direction or the second direction to the third direction, or vice versa.

3. The method of claim 1, comprising:
receiving a search query that includes a query term;
determining that the first concept is defined by a plurality of terms including the query term;
determining that the second concept is defined by a plurality of terms including a particular term; and
outputting the particular term as a term that is close in meaning to the query term.

4. The method of claim 1, wherein aggregating the strength values of the multiple connections that define the path comprises:
aggregating direction-specific strength values of the multiple connections that define the path, in a direction of traversal from the first direction to the second direction.

5. The method of claim 1, wherein each concept is defined by a synset, and wherein each synset includes a collection of synonyms.

6. The method of claim 1, comprising:
selecting a scaling factor that increases as the number of connections along the path increases; and
determining the scaled aggregated strength value using the scaling factor.

7. A system comprising:
one or more computers and one or more storage devices storing instructions that are operable, when executed by the one or more computers, to cause the one or more computers to perform operations comprising:
accessing, by one or more computers, a hierarchical network of connected concepts that defines a semantic space, the concepts being connected to one another through connections that have different strength values and different types of relationships, the relationships including (i) a parent-child type of relationship that connects concepts in a first direction in the hierarchical network, (ii) a child-parent type of relationship that connects concepts in a second, different direction in the hierarchical network, and (iii) a lateral bond type of relationship that connects concepts in a third, different direction in the hierarchical network;
identifying multiple connections that define a path between a first concept and a second concept in the hierarchical network;
aggregating the strength values of the multiple connections that define the path;
determining that one or more changes in direction occur along the path;
scaling, by one or more computers, the aggregated strength value using a penalty factor based on determining that one or more changes in direction that occur along the path; and
assigning the scaled strength value as a value that quantifies a proximity of the first concept to the second concept in the semantic space.

8. The system of claim 7, wherein determining that one or more changes in direction occur along the path comprises determining a quantity of times that the path changes from the first direction or the second direction to the third direction, or vice versa.

9. The system of claim 7, wherein the operations comprise:
receiving a search query that includes a query term;
determining that the first concept is defined by a plurality of terms including the query term;
determining that the second concept is defined by a plurality of terms including a particular term; and
outputting the particular term as a term that is close in meaning to the query term.

10. The system of claim 7, wherein aggregating the strength values of the multiple connections that define the path comprises:
aggregating direction-specific strength values of the multiple connections that define the path, in a direction of traversal from the first direction to the second direction.

11. The system of claim 7, wherein each concept is defined by a synset, and wherein each synset includes a collection of synonyms.

12. The system of claim 7, wherein the operations comprise:
selecting a scaling factor that increases as the number of connections along the path increases; and
determining the scaled aggregated strength value using the scaling factor.

13. A non-transitory computer-readable medium storing software comprising instructions executable by one or more computers which, upon such execution, cause the one or more computers to perform operations comprising:
accessing, by one or more computers, a hierarchical network of connected concepts that defines a semantic space, the concepts being connected to one another through connections that have different strength values and different types of relationships, the relationships including (i) a parent-child type of relationship that connects concepts in a first direction in the hierarchical network, (ii) a child-parent type of relationship that connects concepts in a second, different direction in the hierarchical network, and (iii) a lateral bond type of relationship that connects concepts in a third, different direction in the hierarchical network;
identifying multiple connections that define a path between a first concept and a second concept in the hierarchical network;
aggregating the strength values of the multiple connections that define the path;
determining that one or more changes in direction occur along the path;
scaling, by one or more computers, the aggregated strength value using a penalty factor based on determining that one or more changes in direction that occur along the path; and
assigning the scaled strength value as a value that quantifies a proximity of the first concept to the second concept in the semantic space.

14. The medium of claim 13, wherein determining that one or more changes in direction along the path comprises determining a quantity of times that the path changes from the first direction or the second direction to the third direction, or vice versa.

15. The medium of claim 13, wherein the operations comprise:
receiving a search query that includes a query term;
determining that the first concept is defined by a plurality of terms including the query term;
determining that the second concept is defined by a plurality of terms including a particular term; and
outputting the particular term as a term that is close in meaning to the query term.

16. The medium of claim 13, wherein aggregating the strength values of the multiple connections that define the path comprises:
aggregating direction-specific strength values of the multiple connections that define the path, in a direction of traversal from the first direction to the second direction.

17. The medium of claim 13, wherein each concept is defined by a synset, and wherein each synset includes a collection of synonyms.

18. The medium of claim 13, wherein the operations comprise:
- selecting a scaling factor that increases as the number of connections along the path increases; and
- determining the scaled aggregated strength value using the scaling factor.

* * * * *